Aug. 9, 1960
I. D. McEACHERN
2,948,100
GRAIN GATHERING ATTACHMENT FOR COMBINES
Filed Nov. 19, 1958
2 Sheets-Sheet 1
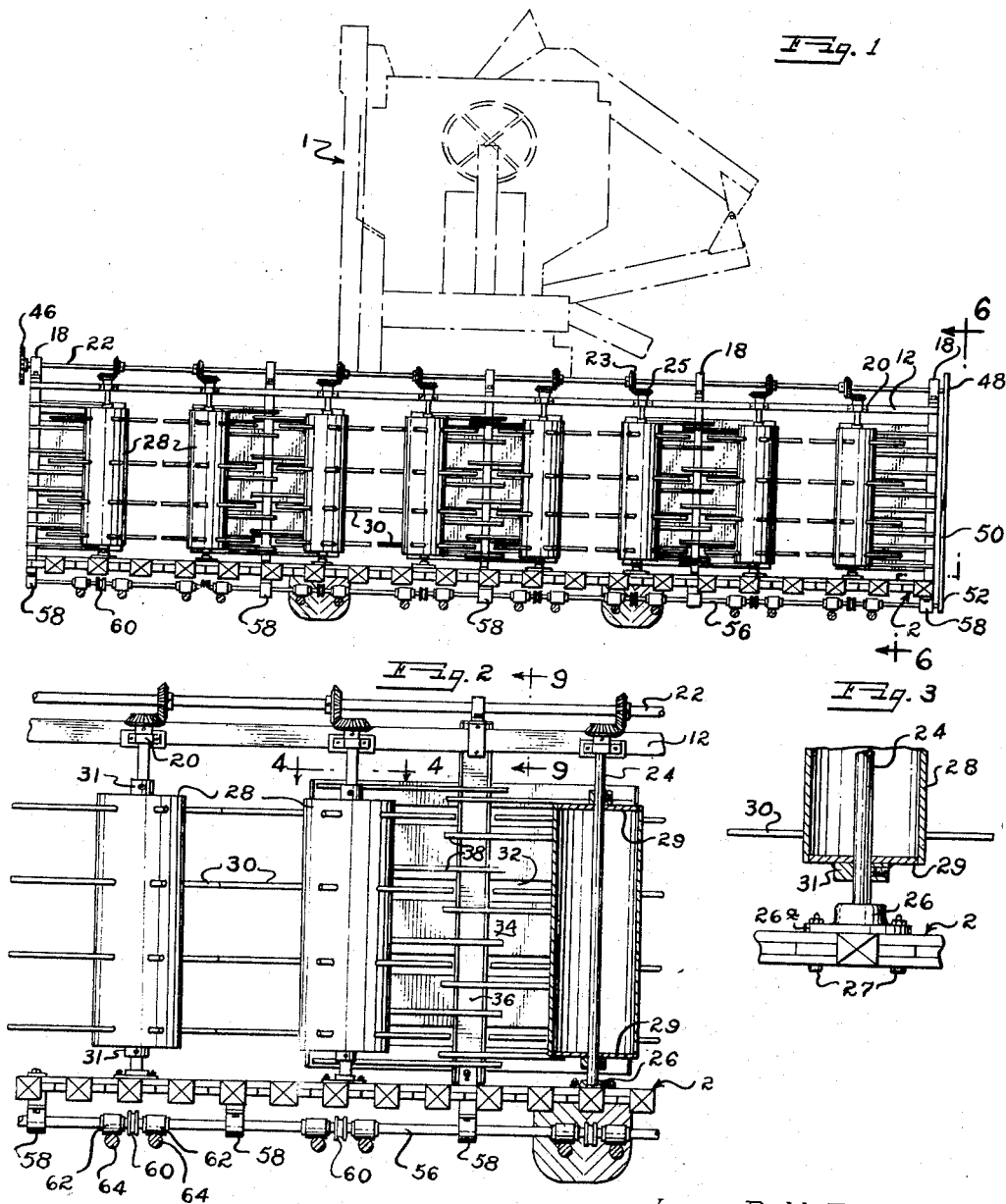
Irvin D. McEachern
INVENTOR.

Aug. 9, 1960     I. D. McEACHERN     2,948,100
GRAIN GATHERING ATTACHMENT FOR COMBINES
Filed Nov. 19, 1958     2 Sheets-Sheet 2
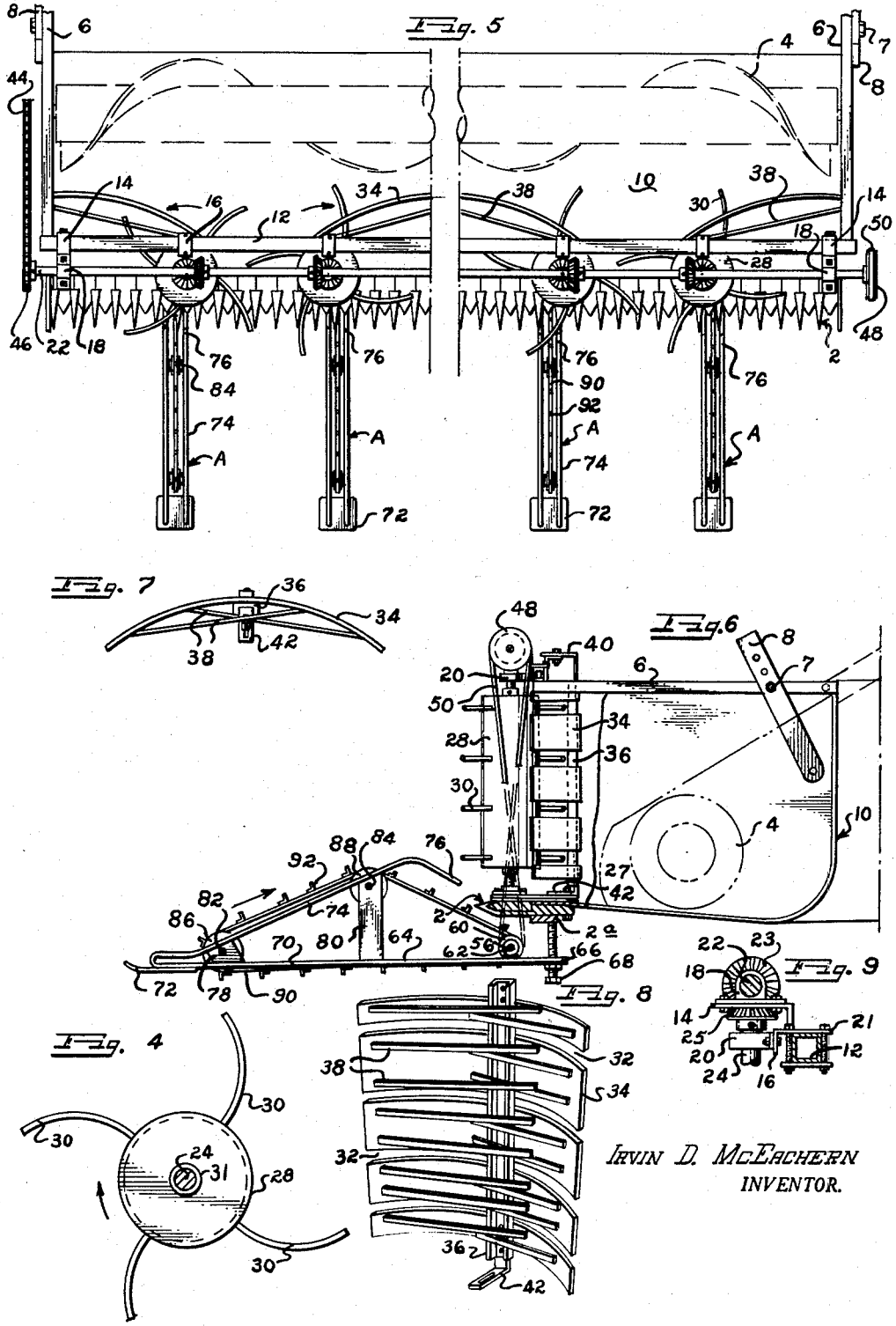
IRVIN D. McEACHERN
INVENTOR.

United States Patent Office 2,948,100
Patented Aug. 9, 1960

2,948,100

GRAIN GATHERING ATTACHMENT FOR COMBINES

Irvin D. McEachern, Rte. 2, Hale Center, Tex.

Filed Nov. 19, 1958, Ser. No. 775,054

4 Claims. (Cl. 56—119)

This invention relates to improvements in attachments for combines and more particularly to an attachment which will enable the harvesting of row crops, such as maize, kaffir corn, corn, cane and other grain sorghums, with a broadcast type combine.

Combines that have been in general use heretofore were of a character which utilized a sickle for cutting the grain and a reel, with a horizontal axis mounted above the sickle, to direct the grain thereinto, and into a conveyor for directing the cut grain into a threshing apparatus, as is well known in the art of harvesting machines. When combines of the broadcast type are used, that is, combines which have an elongated sickle for cutting grain at all points along the length of the sickle, difficulty has been experienced in using such combines for row crops, of the type generally known as grain sorgums, because of the wide variations in the height of the heads of the grains being cut.

In the present invention, an attachment is provided which brings the stalks of the grain, regardless of height, into the sickle in such manner that these will be cut and directed into the conveyor for threshing, with a minimum waste of grain, due to shattering, which device should be interchangeable with the reel type attachment. The present device also provides for picking up stalks which are bent toward the row middles, which stalks would otherwise be wasted, as it is the usual practice to cut grain sorgums from twelve to eighteen inches above the ground, and if the stalk is bent or has fallen below this level, the average combine would not bring the stalk into contact relation with the sickle, to be directed into the conveyor for threshing.

In the cutting of small grains, such as oats, barley, and wheat, which has been sown broadcast or "drilled" in very close rows, it is preferable to use the conventional horizontal type reel, that is, a member with horizontal slats mounted thereon which rotates about a horizontal axis and directs the grain against the sickle for cutting, and thence onto the conveyor, which conveyor is usually of the double spiral screw type. However, since maize, kaffir corn, corn, sorgum canes and the like, grow to a height greater than the height of the axis of the horizontal reel, such reel has a deterring effect on the cutting of grains of such height, and if regulated to accommodate the taller grains, the shorter stalks will not be within the arc in which the reel swings.

It is to the end of harvesting the grains which vary greatly in height, that the present device has been designed. To use the present device, the reel of the combine is removed and replaced with a drive shaft, which drive shaft may be driven by the same mechanism that would drive the reel, on a reel type combine. However, the drive shaft for driving the present device, preferably has beveled gears thereon, or other gearing arrangement, which will drive the vertical shafts at right angles thereto, in such manner that the vertical shafts, driven by such gears, will rotate pairs of vertically arranged cylinders, one of which will operate on each side of each row, and will rotate in opposite directions to direct the stalks of grain therebetween. The cylinders have curved fingers secured thereto, so that the curved fingers of each pair of cylinders will urge the grain, in the row therebetween, into contact relation with a reciprocating sickle, whereby the stalks are cut and directed onto the conveyor to be conveyed into the threshing cylinder. By having the parts interchangeably arranged, one combine can serve the dual purpose of harvesting a broadcast crop of small grain, and for harvesting row crops, such as grain sorgums.

An object of this invention is to provide an effective gathering attachment for combines, which will gather grain sorgums and other crops, including maize, kaffir corn, corn, cane and other crops which are planted in rows.

Another object of the invention is to provide an effective mechanism for directing stalks, onto the sickle of a broadcast type combine.

Still another object of the invention is to provide an effective mechanism, whereby bent stalks may be lifted and directed against the sickle and onto the conveyor of the combine.

Yet another object of the invention is to provide, for a conventional combine, a gathering device for row crops, the heads of which have grown to different heights, whereby such grains are directed onto the sickle of the combine without waste or loss.

A yet further object of the invention is to provide a device which will be simple in construction, easy to attach to and to remove from a combine, and which requires a minimum of maintenance.

With these objects in mind and others which will become manifest as the description proceeds, reference is to be had to the accompanying drawings in which like reference characters designate like parts in the several views thereof, in which:

Fig. 1 is a front elevational view of a broadcast type combine, wherein vertical gathering cylinders have been attached thereto and connected in geared relation therewith, so as to direct grains, which have been planted in rows, thereinto;

Fig. 2 is an enlarged, fragmentary front elevational view of gathering cylinders and the sickle arrangement, with parts broken away, and with parts shown in section to bring out the details of construction;

Fig. 3 is an enlarged, fragmentary view of the lower portion of a cylinder, showing the manner of mounting the cylinder supporting shaft on the sickle bar;

Fig. 4 is a sectional view taken on the line 4—4 of Fig. 2, looking in the direction indicated by the arrows;

Fig. 5 is a fragmentary, top plan view of the apron conveyor portion of a combine, showing the conveyor therein with the sickle bar attached thereto, and showing gathering fingers for lifting bent stalks of grain, and showing the vertical gathering cylinders for directing the stalks of cut grain onto the conveyor;

Fig. 6 is a sectional view taken on the line 6—6 of Fig. 1, looking in the direction indicated by the arrows;

Fig. 7 is a top plan view of the stripping shields for stripping stalks of grain from the fingers on the cylinders;

Fig. 8 is a perspective view of the stripping shields as shown in Fig. 7, showing the lower mounting bracket extending therefrom; and Fig. 9 is an enlarged fragmentary, elevational view of the upper bearing mounts for the grain gathering cylinders, and for the drive shaft thereof, taken on the line 9—9 of Fig. 2, looking in the direction indicated by the arrows.

With more detailed reference to the drawing, the numeral 1 designates generally a combine of the character used to cut and thresh grain, as the combine moves across the terrain. The numeral 2 designates generally a conventional reciprocating sickle of a combine such as is used for cutting small grains, and which is often from twelve to eighteen feet in length. The numeral 4 designates the conveyor of the combine, which may be of the double spiral, auger type. However, the present device is adapted to be used on a combine having any type conveyor. Support arms are indicated at 6, one of the arms 6 being secured to each end of the combine to extend forwardly thereof. The arms 6 normally support a horizontal shaft on which a reel (not shown) is mounted. The power for driving the horizontal shaft of the reel is usually an internal combustion engine, which engine is also the power unit which propels the combine 1 across the field.

The arms are preferably pivoted at their inner ends to the frame of the combine 1 and are held in supported relation by braces 8 on the frame, which is secured to the combine and extend upward and are adjustably secured to the respective arms by bolts 7, or other suitable fastening means.

The entire conveyor apron assembly is designated generally by the numeral 10, which assembly is raised and lowered with the sickle 2, so as to cut at the desired height above the ground. The apron encloses a double spiral, screw conveyor 4 therein, in such manner that the screw conveyor is rotated to direct the cut grain toward the denter of the conveyor and into the throat of the combine 1, where the grain is directed into the threshing compartment, in a manner well understood in the art of threshing machines.

In the present arrangement, a header bar 12 is mounted on arms 6, above and in longitudinally aligned relation with respect to sickle 2. The header bar 12 is preferably square and is adapted to receive clamp members 14 and 16 thereon, which clamp members mount bearings 18 and 20 respectively, for journaling shafts 22 and 24 therein. The shaft 24 is mounted at right angles with respect to horizontal shaft 22, which shaft 24 has a foot bearing at the lower end thereof, as will best be seen in Figs. 2 and 3. The clamps 14 and 16 are readily adjustable, within the length of the header bar 12, so that pairs of shafts 24, each carrying a cylinder 28 thereon, may be mounted on the header bar 12 and on sickle 2, with any desired spacing therebetween to accommodate rows of varying widths.

The cylinders 28 have outwardly extending, arcuate fingers secured thereon, which fingers are circumferentially spaced and extend from the respective cylinders in spaced apart circumferential rows, with the fingers of adjacent cylinders lying within the same plane. The cylinders 28 are timed to turn in geared relation with respect to shaft 22, so that the fingers secured to the respective cylinders 28 will not conflict, even though they extend within the circumferential path of the fingers of the adjacent cylinder. The fingers 30 are preferably circumferentially spaced on the respective cylinders 28, so as to convey the stalks against the sickle and onto the conveyor apron in a uniform manner. It has been found that four of these fingers in each circumferential row will guide the stalks therethrough in a uniform manner, with each of the adjacent cylinders, on opposite sides of the stalks, turning in opposite directions, so that the fingers thereof will direct the stalks between the pairs of adjacent cylinders, against the sickle 2 and onto the conveyor 4.

The fingers 30, on adjacent, complementary cylinders are inversely curved in such manner as to move the stalks inward against sickle 2, but will pass within slots 32 between shields 34 mounted between adjacent but non-complementary cylinders, so that the stalks of grain, which have been cut, will be left on the apron of the conveyor for conveying into the threshing compartment.

The shields 34 are mounted on the respective upright standard 36 and are secured to the standard intermediate Each standard 36 has the top portion thereof secured to the header bar 12 and the lower end thereof secured to the support bar of sickle 2. Braces 38 extend from the outer edge of the respective shields across the upright standard 36 and are secured to the standard intermediate the length of the brace, each end of which is secured to the shield, so that the shield is thoroughly braced. The arcuate fingers 30 pass into slots 32 between shields 34, and are so curved as to disengage themselves from the grain stalks as these curved fingers pass into the slots 32 between the shields 34. The header bar 12 is of such height that the stalks, which are drawn inward by the fingers 30, will be drawn therebelow and onto conveyor apron 10.

The respective standards 36 each has an out-turned angle member 40 at the top thereof and an out-turned angle member 42 at the bottom thereof, to enable the standards 36 to be secured to the header bar 12 and to the bar which mounts the sickle 2, respectively. The standards 36 may be so adjusted that the curved fingers 30 will pass through slots 32 in such manner that the curvature thereof will transfer the stalks of grain being cut to the convex side of the curved shields 34 in a substantially tangential manner, so that the stalks will be directed onto the conveyor apron 10 and into the conveyor 4.

The cylinders 28 preferably have closed ends 29 on each of which closed ends a set collar 31 is welded so that a set screw therein will engage shaft 24 to hold the cylinder against relative longitudinal and rotary movement with respect to shaft 24. The shaft 22 extends across and above the forward side of the conveyor apron 10 and normally replaces the shaft which drives the reel. The shaft 22 is driven by a chain 44 which passes over a drive sprocket (not shown) on the prime mover, and over sprocket 46, which sprocket is secured to the end of shaft 22. The opposite end of shaft 22 preferably has a belt-pulley 48 secured thereto over which a belt 50 passes, which belt 50 is preferably rounded or V-shaped, and which is preferably of a character which may be crossed, so as to drive pulley 52 in the opposite direction from that in which pulley 48 is driven. The pulley 52 is mounted on the end of shaft 56, which shaft extends throughout the length of sickle 2 and preferably therebelow, and which shaft is journaled in bearings 58 which are secured to the support bar of the sickle 2 at spaced intervals therealong. At spaced intervals along shaft 56 pulleys 60 are positioned, which pulleys are secured to the shaft substantially in a transverse vertical plane which passes through the axis of shafts 24 which carry the respective cylinders 28. On each side of each of the pulleys 60 is a bearing 62, which bearings are journaled on shaft 56. The bearings 62 each have a rod 70 secured thereto, a portion 66 of which extends rearward and has a set screw 68 passing therethrough so as to be in abutting relation with bar 2a on the lower side of sickle 2. When each bar portion 66 is adjusted relative to bar 2a, a lock nut on set screw 68 may be tightened, to maintain each of the bar portions 66 against movement in one direction. The opposite end of each bar portion 66, as indicated at 70, extends outward and has ground engaging shoe 72 thereon, which shoe ties the bars 70 together in spaced relation, as will best be seen in Fig. 5. Each bar 70 has a re-entrant portion 74 which extends upward at an angle, with the ends 76 thereof being positioned substantially above the forward edge of the sickle 2. The bars 70 and 74 are braced by braces 78 and 80, which braces receive shafts 82 and 84 therethrough, on which shafts the respective sheave pulleys 86 and 88 are journaled. A belt 90, having lugs 92 thereon, surrounds pulleys 60, 86, and 88, so upon rotation of shaft 56, the belt 90 will be driven in the direction indicated by the arrows, as will be seen in Fig. 6.

It is to be pointed out that, upon raising or lowering the conveyor apron 10 of the combine, the arms for gathering fallen stalks, as indicated at A, will be raised or lowered. Each shoe 72 may be adjusted to skim at the top of the ground or slightly thereabove, by means of set screws 68, so that the stalks will be directed upward onto bars 74, whereupon the lugs 92 on belt 90 will move the stalks upward and into engagement with the sickle 2. As the stalks leave the inner ends 76 of the bars 74, the fingers 30 will direct the stalks onto the apron 10 of the combine.

While the set collars 31 are shown to be used to engage the shafts 24, it is to be understood that the heads 29 of cylinders 28 may be welded directly to the shafts 24.

*Operation*

The combine, indicated generally at 1, is of the character that is self-propelled, and has a conveyor apron 10 forward thereof, on the forward edge of which reciprocating sickle 2, of conventional type, is mounted. The sickle 2 is reciprocated by a conventional mechanism (not shown) in a manner well understood in the art of combines. The bar which supports the sickle 2 has foot bearings 26 bolted thereto by bolts 27 at spaced intervals throughout the length of sickle bar 2. The foot bearings 26 support pairs of upstanding shafts 24 at spaced intervals, so that cylinders 28 are mounted on the respective shafts 24, will be on each side of a planted row, and the upstanding standards 36 will be in the "middles," that is, between the planted rows of the grain being cut. The cylinders 28 are secured to the shafts 24 at top and bottom by set collars 31, which are welded to the ends thereof and have set screws to engage shaft 24. The upper end of the respective shafts 24 are journaled within bearings 20, which bearings are mounted on header bar 12 by clamps 16, in such manner that the bearings may be moved along the header bar so as to obtain the proper spacing between the cylinders 28, and also the proper spacing of the pairs of cylinders with respect to the planting of the row. Each of the shafts 24 has a bevel gear 25 secured thereon, which complementally engages a bevel gear 23 which is secured to shaft 22. The bevel gears of adjacent complementary pairs of cylinders 28 are inversely arranged, so as to turn in a direction to direct the grain being cut inward toward conveyor 10, when fingers 30 are rotated in the direction indicated by the arrows in Figs. 4 and 5.

As the cylinders 28, having arcuate fingers 30 thereon, rotate in the direction indicated, and with the conveyor belts 90 traveling in the direction indicated by the arrow, the grain will be directed against the sickle 2 and into double spiral conveyor auger 4, from whence it will be directed into the threshing compartment (not shown), in a manner well understood in the art of combines and threshing machines.

It is also to be pointed out that bevel gears 23 are attachably secured to shaft 22 so the gears 23 may be readily adjusted on shaft 22 with respect to gears 25.

Furthermore, the brackets 14, carrying bearings 18, are attachably secured to header bar 12 and brackets 26a are attachably secured to the bar 2a, to enable the assembly to be readily and quickly taken off, so as to be interchanged with a horizontal shaft, reel type combine attachment, when the need arises for the use of such attachment.

While the device has been illustrated and described in some detail in one embodiment thereof, it is to be understood that changes may be made in the minor details of construction and adaptations made to different installations, without departing from the spirit of the invention or the scope of the appended claims.

Having clearly shown and described the invention, what is claimed as new and desired to secure by Letters Patent is:

1. In a combine for the harvesting of grain, including cutter means and a conveyor apron structure for receiving the grain, the combination therewith of a gathering attachment for row crops, which attachment comprises a header bar mounted on said combine and supported above said cutter means, spaced apart bearings mounted on said header bar, a horizontally arranged drive shaft journaled in said bearings so as to be in approximately aligned relation with said cutter means, a second series of bearings, which bearings are mounted on said cutter means at spaced intervals therealong, an upstanding shaft mounted in each of said bearings on said cutter means, gearing on said horizontal shaft, a gear on the upper end of each of said upstanding shafts, which gears on said upstanding shafts are adapted to complementally engage the respective gears on the horizontal shaft in such manner that alternate upstanding shafts will be driven in opposite directions, a cylinder of substantially greater diameter than the respective upstanding shafts mounted on and fixedly secured to each of said upstanding shafts for rotation therewith, the axis of each said upstanding shaft and the axis of the respective cylinder mounted thereon being coaxial, each said upstanding shaft extending throughout the length of said cylinder thereon, fingers fixedly secured to and extending from said respective cylinders in circumferentially arranged rows, which rows are spaced apart longitudinally on the respective cylinders, which fingers of adjacent cylinders on opposite sides of a row of grain are in the same plane and overlap each other in a horizontal direction, said gearing being adapted to rotate said cylinders bearing said fingers, in timed relation to direct stalks of grain therebetween.

2. A gathering attachment for a combine as defined in claim 1, wherein said fingers on said respective complementary cylinders are curved in opposed relation, with the respective distal ends of said fingers trailing with respect to radial lines extending outward from the point of juncture of the inner ends thereof with the respective cylinders when said cylinders are being rotated.

3. A gathering attachment for a combine as defined in claim 1, wherein upstanding members are mounted on said cutter means and secured thereto, the upper end of said upstanding members being connected to said header bar, shield bars mounted on said upstanding members medially of the length of said shield bars, the ends of which shield bars curve forwardly, the respective bars which form said curved shields are spaced apart on the respective upstanding members to form horizontal slots between the outer extremities thereof, which shields are arranged in close proximity to the rear of the respective adjacent cylinders between the respective rows, so said fingers of the respective cylinders will pass through the slots which are formed between the respective curved bars.

4. A gathering attachment for a combine as defined in claim 1, wherein a longitudinal shaft is positioned below said cutter means, and wherein driving means is provided for driving said shaft, spaced apart pulleys mounted on said longitudinal shaft, bearing members journaled on each side of the respective pulleys, outwardly extending rods secured to said bearing members, which outwardly extending rods form a frame, a pulley journaled on said frame, belts passing over said first mentioned pulleys and over said pulleys on said frame, lugs on said belts, which lugs project above the top of said frame for a portion of the length of said frame, said outwardly extending bars having a portion thereof extending inwardly beneath said cutter means, an adjustment threadably engaging at least one of said bars and extending upwardly into bearing relation with the bottom of said cutter means rearward of said longitudinal shaft.

References Cited in the file of this patent

UNITED STATES PATENTS

| | | |
|---|---|---|
| 2,835,097 | Sullivan | May 20, 1958 |
| 2,836,026 | Gray et al. | May 27, 1958 |